United States Patent

Wright et al.

[15] 3,706,242

[45] Dec. 19, 1972

[54] ROTARY BLADE CABLE STRIPPER

[72] Inventors: James R. Wright, Pompey; Ralph E. BeVard, Fayetteville, both of N.Y.

[73] Assignee: The Eraser Company, Inc., Syracuse, N.Y.

[22] Filed: June 7, 1971

[21] Appl. No.: 151,471

[52] U.S. Cl. ................................................. 81/9.51
[51] Int. Cl. ............................................. H02g 1/12
[58] Field of Search ......................... 81/9.51, 9.5 A

[56] References Cited

UNITED STATES PATENTS

| | | | |
|---|---|---|---|
| 2,285,167 | 6/1942 | Montgomery | 81/9.51 |
| 2,393,919 | 1/1946 | Lucarelle et al. | 81/9.51 |
| 3,074,301 | 1/1963 | Carpenter | 81/9.51 |
| 3,537,339 | 11/1970 | Carpenter | 81/9.51 |

Primary Examiner—Robert C. Riordon
Assistant Examiner—Roscoe V. Parker, Jr.
Attorney—Bruns & Jenney

[57] ABSTRACT

A machine for stripping the insulation from the ends of heavy wires and cables has a continuously rotating blade which is radially adjustable toward and away from an axially extending hole in the revolving blade carrying member. Means are provided for gripping a cable and advancing it axially through the hole and bushing means are provided in the hole for centering the cable therein. The blade is oscillatably secured on its carrying member so that it can swing away from the hole. Stop means are provided on the carrying member for limiting the swinging of the blade away from the hole so that the blade engages the cable insulation as the cable is fed through the hole and the blade then cuts the insulation when retracting the cable swings the blade inward against the blade carrying member.

3 Claims, 8 Drawing Figures

INVENTOR.
JAMES R. WRIGHT &
RALPH E. BEVARD
BY Bruns & Jenney

ATTORNEYS.

PATENTED DEC 19 1972 3,706,242

INVENTOR.
JAMES R. WRIGHT &
RALPH E. BEVARD
BY Bruns & Jenney
ATTORNEYS

ROTARY BLADE CABLE STRIPPER

BACKGROUND OF THE INVENTION

This invention relates to a machine for stripping the insulation from the end of a cable and relates more particularly to a stripper in which a substantially radially disposed blade adjustably and pivotally mounted on a continuously rotating disk is adapted to swing away from the cable as it is advanced through an axially extending hole in the disk and then to swing back and cut a tubular section of insulation from the cable when the cable is drawn back through the hole.

Such rotating blade strippers that have been known have had spring means for holding the blade in engagement with the invention. The spring is often too weak to overcome the centrifugal force to which the blade is subjected or, when the blade becomes dull, the spring means fail to cause the blade to properly dig into the insulation resulting in a ragged cut into the insulation and a less than desired length of wire exposed by the stripping.

SUMMARY OF THE INVENTION

The machine of the present invention has a blade holder mounted on a rotating apertured disk, the holder having adjustment means for adjusting the blade radially on the disk so that it can cut the insulation to a point just short of the axially extending wire in the cable. The blade is pivotally mounted in the holder so that it can be swung away from the cable as it is advanced through the aperture of the disk, the aperture being provided with a tubular bushing to center the cable in the aperture. Adjustable stop means are provided on the blade holder, however, so that it can be adjusted to prevent the blade from being swung out of contact with the insulation of the cable.

With the stop means properly adjusted, the blade digs into the insulation of the cable as it is advanced through the disk aperture, threading itself into the insulation. When the cable is drawn back through the aperture, the blade is swung back toward the disk and bites down through the insulation to cut it radially.

A cable gripping clamp is provided for gripping the cable and advancing it through the bushed aperture of the disk for the proper distance and then withdrawing the cable from the aperture.

DESCRIPTION OF THE PREFERRED EMBODIMENT

Figure 1:
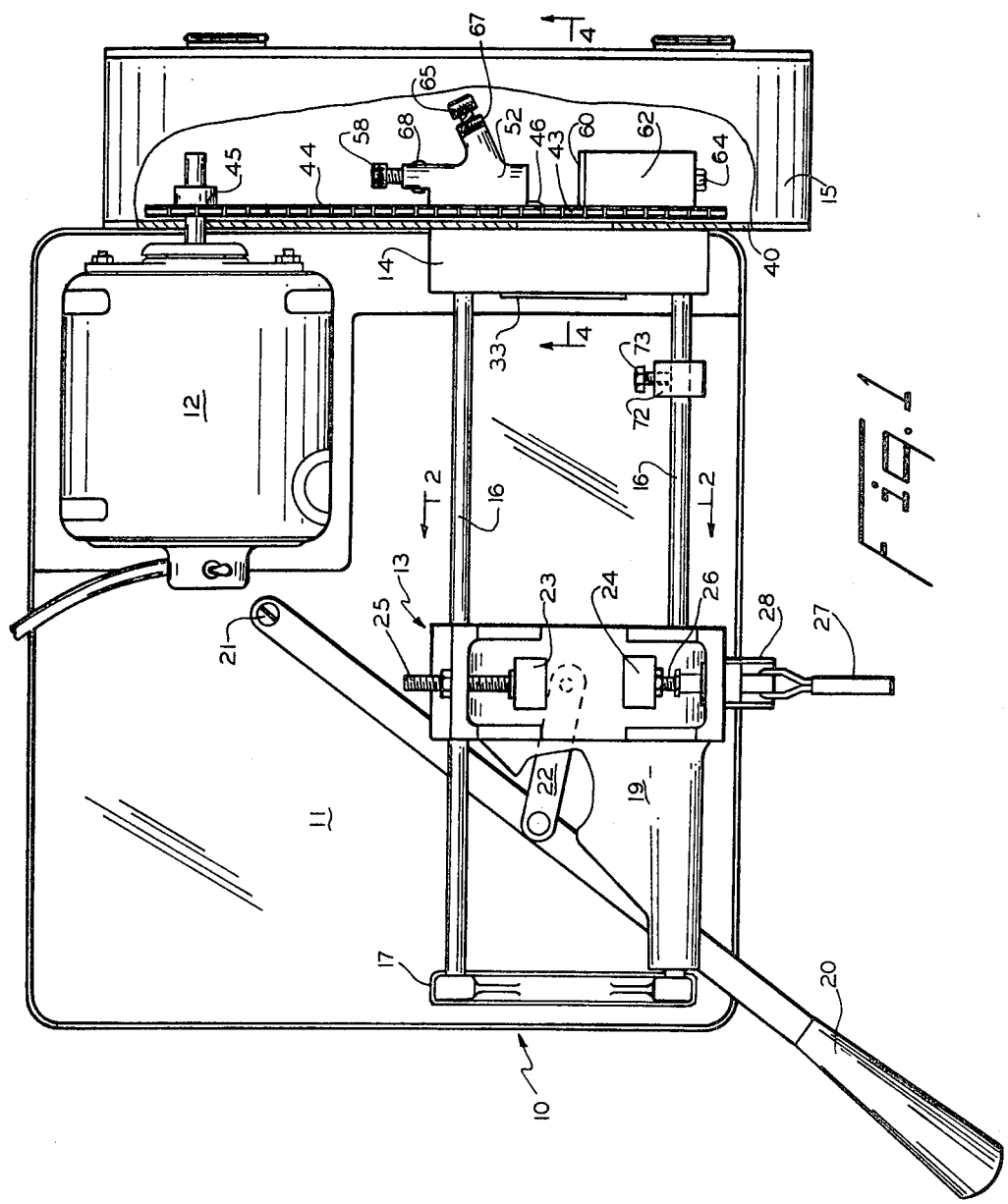
FIG. 1 is a plan view of a machine according to the invention, certain parts being broken away for clarity.

Referring to FIG. 1, the machine 10 comprises a table 11 on which is secured a motor 12, a cable gripping and advancing device 13, a bearing assembly 14, and certain rotating parts enclosed in a housing or shroud 15. Table 11 may be provided with legs or adapted to rest on a shelf or other support.

Figure 2:
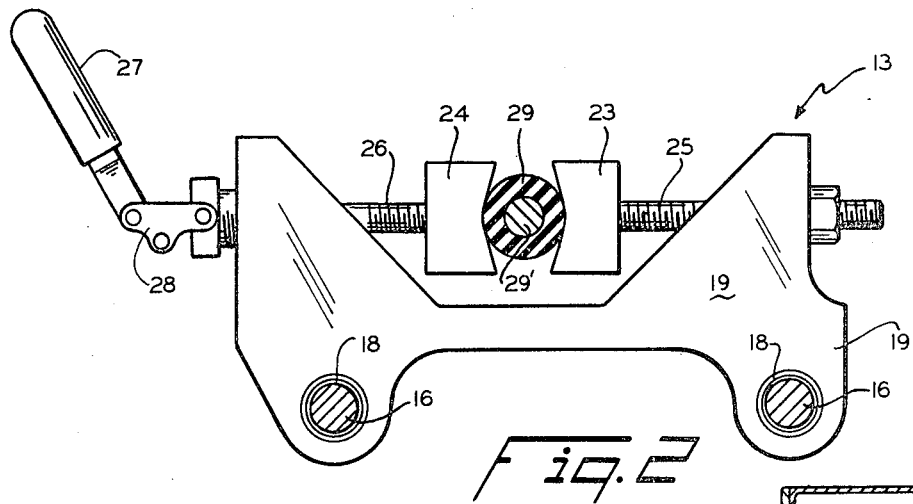
FIG. 2 is an enlarged sectional view on the line 2—2 of FIG. 1 showing a cable gripped by the clamp.

The cable gripping and advancing device 13 comprises a pair of parallel rods 16 spaced above table 11 and extending from a suitable support bracket 17, secured to the table to the bearing assembly 14. Rods 16 extend through holes 18 in a carriage 19, as shown in FIG. 2. An advancing lever 20 has one end pivotally secured to the table at 21 and connected to the carriage by a link 22 whose ends are pivotally secured to the lever and carriage respectively, so that when the lever is moved to the right in FIG. 1 the carriage is advanced toward the bearing assembly 14.

Carriage 19 has a pair of cable-gripping jaws 23 and 24, the fixed jaw 23 being adjustably supported from one side of the carriage on a bolt 25 extending transverse the carriage. The movable jaw 24 is supported on another bolt 26 extending from the other side of the carriage. Jaw 24 may be withdrawn from a position near the centerline above rods 16, as shown in FIG. 2, to a position, shown in FIG. 1, by moving the handle 27 of a conventional toggle clamp arrangement 28, shown diagrammatically in FIG. 1. When handle 27 is raised the jaws 23 and 24, previously adjusted and secured by means of suitable locknuts, grip and center a cable 29 between them as shown in FIG. 2.

Figure 3:
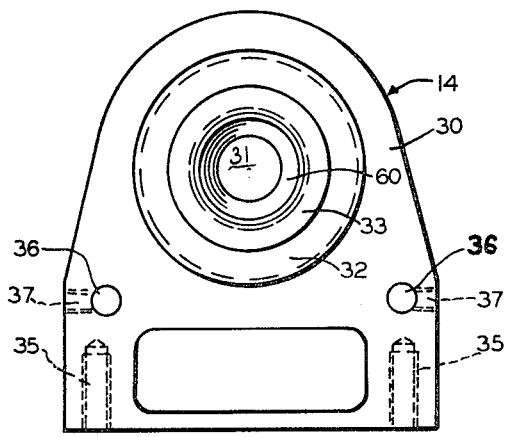
FIG. 3 is an enlarged end elevational view of the bearing assembly shown in FIG. 1.
Figure 4:
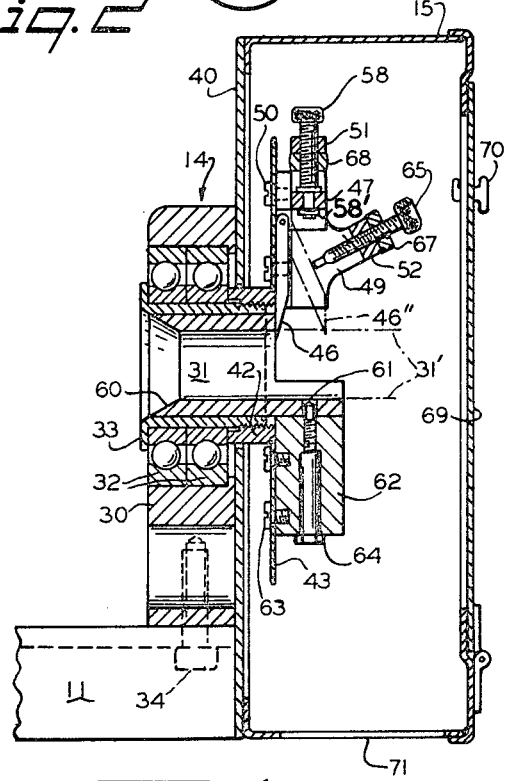
FIG. 4 is a sectional view on the line 4—4 of FIG. 1, some of the parts being shown rotated 90° and exaggeratedly spaced from the housing backplate for clarity.

As best seen in FIGS. 3 and 4, the bearing assembly 14 comprises an upstanding post member 30 having a central opening 31 axially aligned with the cable 29 gripped between the jaws 23 and 24. The opening 31 is equipped with a tandem pair of ball bearings 32-32, for stability, whose inner races support a flanged and threaded spindle 33. The post 30 is secured to table 11 by bolts 34 received in threaded holes 35 at the bottom of the post. Holes 36 are provided for the rods 16 and provision is made at 37 for set-screws to hold the rods in place.

Figure 5:
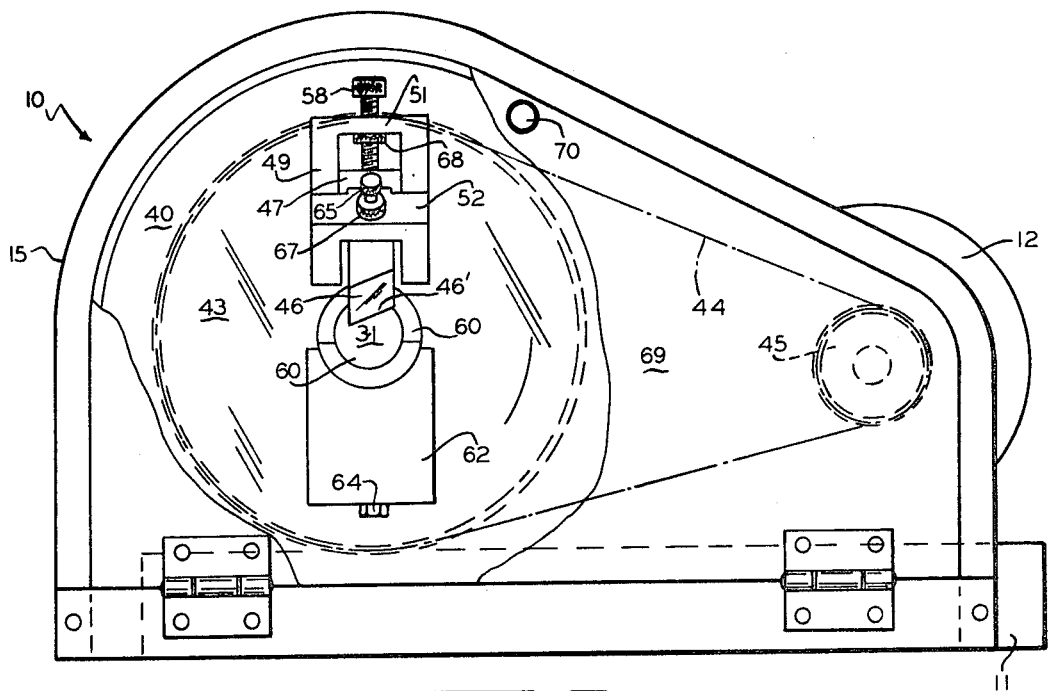
FIG. 5 is an end elevational view of the machine as viewed from the right in FIG. 1, a portion of the shroud being cut away.

As best seen in FIG. 4, the shroud 15 has a backplate 40 secured by means, not shown, to post 30 and the end of table 11, as shown in FIG. 5. Spindle 33 has one end flanged and the other threaded end within shroud 15 and to this end is secured the interiorly threaded hub 42 of an annular sprocket disk 43 welded or otherwise secured to the hub. As best seen in FIG. 1 the sprocket 43 is driven by a chain 44 connecting it to the sprocket 45 on the drive shaft of motor 12.

Figure 6:
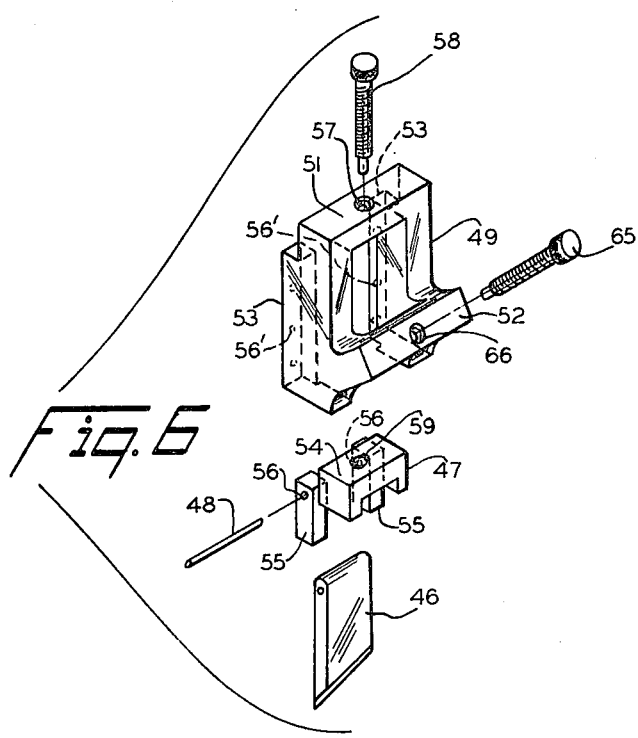
FIG. 6 is an enlarged exploded view of the blade and its support members.

Referring to FIGS. 4, 5 and 6, a blade 46 is oscillatably carried on a sliding block 47 by a pin 48, the block being slideable in a blade holder 49 which is secured by four screws 50 through the sprocket disk 43 to the outer surface of the disk. As seen in FIG. 6, the holder 49 has spaced apart legs bridged at the top by a portion 51 and bridged by another portion 52 projecting at an angle to the sprocket disk 43. The sides of the holder legs toward sprocket 43 have projecting portions 53-53 which are narrower than the legs themselves, thus forming, with the disk of sprocket 43, ways in which the slide 47 is guided, and these portions 53-53 contain the tapped holes for the securing screws 50.

The slide 47 comprises a bridging portion 54 integral with offset leg portions 55—55 which are adapted to slide between way portions 53—53 of the holder. The leg portions 55—55 have suitable aligned holes 56—56 therethrough for the pin 48 and the blade 46 is thereby pivotally secured between legs 55—55 and adapted to swing away from the disk 43.

The bridging portion 54 of the sliding block is adapted to slide between the legs of holder 49 below the bridging portion 51 which has a tapped hole 57 in the center thereof. A radial adjusting screw 58 is adapted to be engaged in the hole 57, the reduced end of the screw passing through a hole 59 in the slide member 47, as best seen in FIG. 4. The end of screw 58 has a push-on retaining washer 58' below the slide 47, as shown, so that the slide may be adjusted toward or away from the axis of rotation of the sprocket disk 43 and spindle 33.

The portions 53—53 of the holder may have aligned holes 56'—56' therethrough so that the slide may be lowered to adjust blade 46 past the axis of hole 31 to align holes 56 with holes 56' so that the pin 48 may be removed without disassembling the holder when it is desired to change the blade.

A bushing 60, with a slide fit in the spindle 33 and a funnel shaped opening toward the carriage 19, is provided and has a stepped or projecting end with a hole 61 therethrough, as shown in FIG. 4. A block 62 is provided diametrically opposite the blade holder 49, the block being secured to the disk 43 by two screws 63 through the disk as shown. Block 62 has a hole therethrough so that a screw 64 threaded in the hole may have its dog point secured in the hole 61, as shown, to carry the stepped bushing 60 with the sprocket disk 43 and blade 46 as they rotate. It will be understood that a number of bushings 60 are provided with each machine 10, each bushing having a different inner diameter so as to provide a centering support for each different size of cable to be processed by the machine.

The blade 46 may be swung away from pulley 43 as indicated in broken lines at 46" in FIG. 4. A stop screw 65 is provided threaded through a hole 66 in the second bridging portion 52 of the holder to adjustably limit the swinging movement of the blade 46. Locknuts 67 and 68, or other locking means, are provided for the screws 65 and 58, respectively, as shown in FIG. 4.

A hinged door 69, with an appropriate catch or lock 70 is provided at the outer side of the shroud 15, for access to the screws 58, 64 and 65, and a hole 71 at the bottom of the shroud is provided for a purpose to be described.

An adjustable stop bushing 72 is also provided slideably mounted on one of the rods 16 and securable in adjusted position by a clamping screw 73 for limiting the movement of carriage 19 toward the bearing assembly 14.

In operation, the clamping jaws 23 and 24 are first adjusted by turning bolts 25 and 26 and tightening their locknuts for proper gripping of the selected cable 29 axially aligned with opening 31. The proper bushing 60 for correct centering of the chosen cable is then installed and secured in place by tightening the dog-end bolt 64.

Screw 58 is then adjusted so that the knife edge 46' of blade 46 just clears the central wire section 29' of the cable 29 so that the blade edge may cut through the insulation without cutting the central wire core 29' of the cable. The cable end may be advanced through the central passage through bushing 60 to make this adjustment. The cutting edge 46' will then be disposed substantially chordally across the end of the central passage in bushing 60, as shown in FIG. 5.

The stop screw 65 is then adjusted to limit the swinging movement of the blade 46 away from the sprocket disk 43. The cable 29 may be advanced for this adjustment, the swinging movement being limited so that the edge 46' of the blade is in firm contact with the cable insulation and denting its outer surface when the blade is in its stop or limited position shown at 46" in broken lines in FIG. 4. It will be noted that, when screw 65 is properly adjusted the edge 46' of the blade still lies chordally disposed with respect to a circle defined by lines along the walls of the passage through bushing 60 extended as indicated by broken lines 31' in FIG. 4.

Cable 29 is then retracted by moving the carriage 19 against the bracket 17. Jaws 23 and 24 are then opened by operating handle 27, the cable advanced until its end is in alignment with the flanged end of spindle 33, and jaws 23 and 24 again tightened by the handle 27.

The distance that cable 29 must be advanced to strip the insulation from its end the desired distance is then determined, by trial and error if necessary, and the stop bushing 72 is secured in position to prevent the carriage 19 from moving beyond that distance, housing door 69 is closed, and motor 12 is started.

Figure 7:
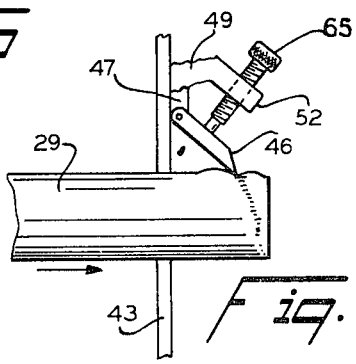
FIGS. 7 and 8 are diagrammatic views showing the operation of the machine.

Cable 29 is then advanced through bushing 60 by moving the lever 20 to the right, as viewed in FIG. 1, until carriage 19 reaches the stop 72, and then the lever is returned to the left withdrawing cable 29 from bushing 60. As cable 29 meets the blade 46, it is swung back against the stop screw 65 and, as the cable is advanced further, the rotating blade digs into the insulation of the cable and threads itself along the cable as shown diagrammatically in FIG. 7.

Figure 8:
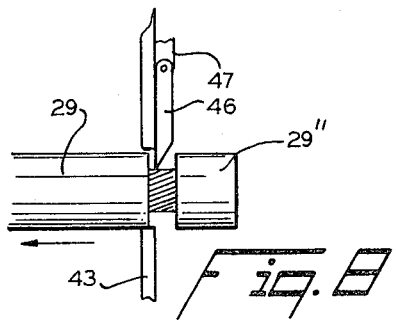

When carriage 19 meets stop 72 and lever 20 withdraws the cable, blade 46 is returned toward the disk of sprocket 43 cutting into the insulation until the blade is stopped by the disk 43, the blade cutting the insulation to a point just short of the enclosed wire 29'. As cable 29 is withdrawn farther the slanted cutting edge end of blade 46 forces the tubular severed end 29" of insulation off of the wire, as shown in FIG. 8, until it drops down through the hole 71 at the bottom of the shroud.

Usually there are a plurality of cables 29 to be cut so that jaws 23–24 may be again opened by handle 27, a new cable 29 placed therein, and manually advanced to the end of spindle 33, the jaws 23–24 again closed, and lever 20 again advanced and withdrawn. When cable of a different size is to be stripped, of course, a new bushing 60 must be substituted and jaws 23 and 24 readjusted.

Machine 10 can quickly strip the ends of cables of different diameters, coaxial cables as well as insulation-only-covered cables, and a cable as large as 1½ inches in diameter can be stripped by removing the bushing 60 and using the threaded spindle 33 itself as a support bushing.

We claim:

1. A machine for stripping the insulation from the ends of heavy wires and cables, comprising: a substantially annular member rotatably supported and having an axially extending hole therethrough, tubular bushing means in the hole having a central passage for centrally supporting a cable end in the hole, a blade holder secured to the annular member, a knife edged blade oscillatably carried by the blade holder and adapted to swing from a cutting position in which one side of the blade lies flat against the annular member with its knife edge disposed substantially chordally across the end of the bushing passage to a stopped position in which the flat side of the blade is at an angle to the annular member with its knife edge disposed chordally across a circle defined by lines along the walls of the passage extended, means associated with the blade holder for adjusting the blade edge toward and away from the axis of the annular member, adjustable stop means associated with the holder for limiting the swinging of the blade in its stopped position with the blade knife edge in contact with and denting the insulation of a cable end projected through the bushing passage, and drive means for rotating the annular member, whereby the end of a cable advanced axially through the bushing passage swings the blade to its stopped position with the blade knife edge engaged therewith and then the withdrawal of the cable swings the blade to its cutting position for cutting a tubular section of cable insulation and stripping it from the cable.

2. The machine defined in claim 1, having a table portion, a bearing assembly supported on the table portion, a spindle rotatably supported in the bearing assembly, the annular member having a hub threadedly secured to the spindle, and sliding carriage means mounted on the table having adjustable clamp means for securing a cable thereon axially aligned with the bushing passage, the carriage means having means associated therewith for moving it axially toward and away from the stopped position of the blade.

3. The machine defined in claim 1 wherein the means for adjusting the blade edge toward and away from the axis of the annular member comprises a threaded adjustment screw, and the means for limiting the swing of the blade comprises another threaded adjustment screw, each screw having locking means associated therewith.

* * * * *

PO-1050
(5/69)

UNITED STATES PATENT OFFICE
CERTIFICATE OF CORRECTION

Patent No. 3,706,242            Dated December 19, 1972

Inventor(s) JAMES R. WRIGHT and RALPH E. BeVARD

It is certified that error appears in the above-identified patent and that said Letters Patent are hereby corrected as shown below:

Col. 1, line 15, "invention" should read -- insulation --.

Signed and sealed this 17th day of April 1973.

(SEAL)
Attest:

EDWARD M. FLETCHER, JR.            ROBERT GOTTSCHALK
Attesting Officer                 Commissioner of Patents